United States Patent Office
3,508,641
Patented Apr. 28, 1970

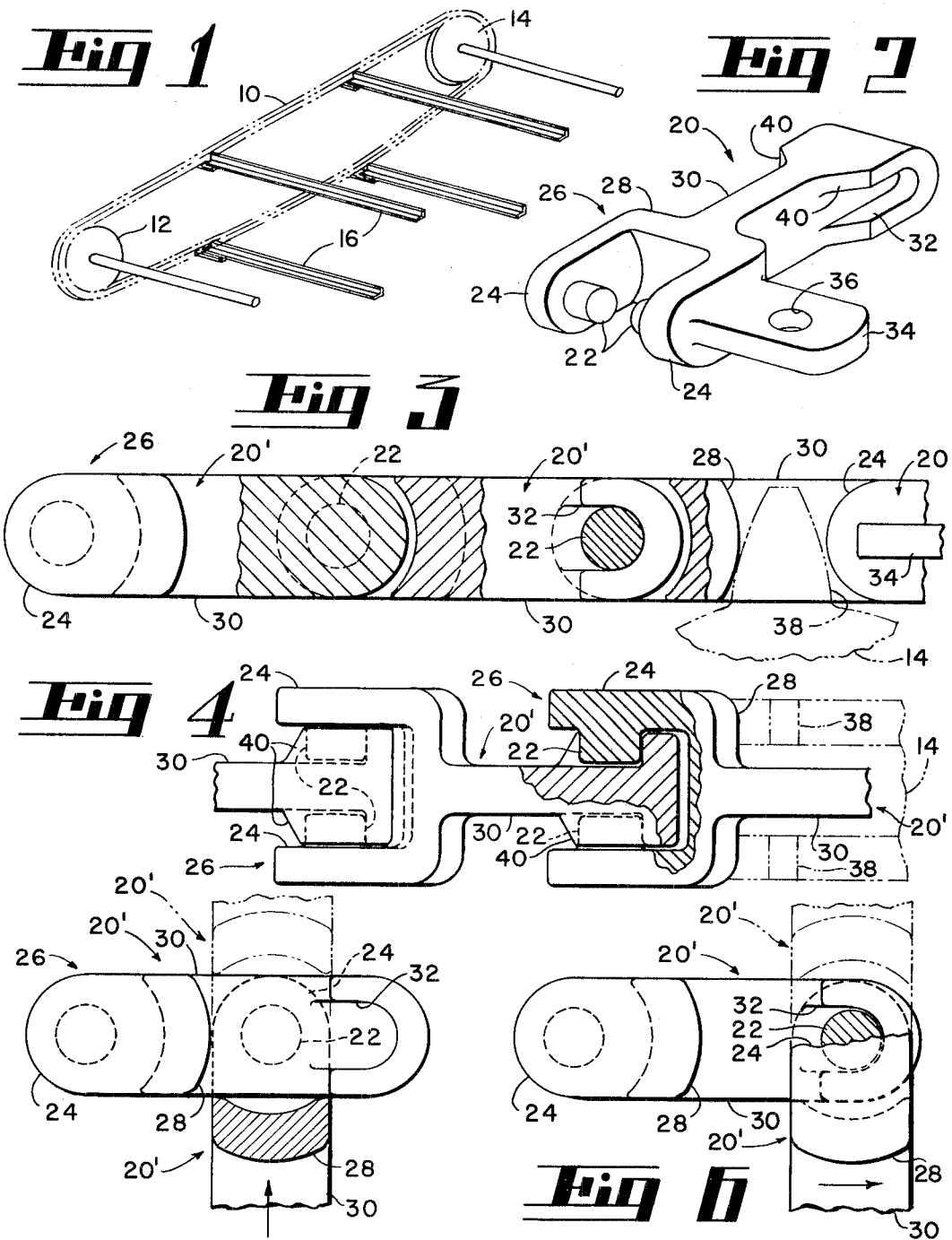

3,508,641
UNITARY CHAIN LINKS
Lawrence J. Vagedes, Celina, Ohio, assignor to Avco Corporation, Coldwater, Ohio, a corporation of Delaware
Filed Aug. 21, 1968, Ser. No. 754,324
Int. Cl. B65g 19/14
U.S. Cl. 198—175                                6 Claims

ABSTRACT OF THE DISCLOSURE

A chain link is provided with a clevis having trunnions projecting inwardly from its arms. A shank projects from the bridge of the clevis and has semi-raceways formed on its sides. The semi-raceways have open ends facing the clevis bridge. The trunnions of a similarly formed link are interdigitated with the shank and then shifted to the closed ends of the semi-raceway for articulation of the two links in forming a chain.

---

The present invention relates to improvements in chains of the type employed in endless loops driven by sprockets and more particularly to improvements in links for forming such chains.

Chains formed by individual links, which are connected to articulate without the use of separate pins, are well known. They have many advantages which particularly suit them for use in conveyor systems and other applications where rigorous operating conditions exist.

Many link constructions have been proposed to provide links which can be readily connected to form a chain loop of desired lengths or replace a broken link. Such proposals have also taken into account the necessity of forming adjacent links in relative positions which would not be encountered when the chain was in actual use. This requirement, rather obviously, fulfills the need of preventing inadvertant separation of the links.

Nonetheless, there has long existed a need for chain links which may be joined with greater facility and flexibility. To amplify further, conveyor chains are often used in environment which make handling of the chain unpleasant and/or in systems where down time is critical. Thus the chain links must be connectable in a minimum time with a minimum of effort and concentration.

Accordingly, one object of the present invention is to fulfill this need and more particularly to minimize the degree of prepositioning required in joining such links. A further aspect of this object is to enable links to be joined when prepositioned in more than one relative angular position to thereby minimize the need for moving the entire chain in order to be able to position a replacement link for connection into a broken chain.

It should be recognized that chains of the present type are often employed in rugged, unsophisticated machines. Thus there is a further requirement and need for such links to be inexpensive, but still form a strong, reliable chain.

Another object is to fulfill the above ends with a link which is inexpensive and forms a high strength chain capable of functioning reliably in use, particularly as a conveyor where bars or the like are connected to the chain.

These ends, in their broader aspects, are attained by unitary chain links having, at one end, a clevis with trunnions projecting inwardly from its arms. A shank projects from the bridge of the clevis to form the other end of the link. Semi-raceways on opposite sides of the shank have open ends facing the clevis' bridge and closed ends at the outer end of the shank. Thus a similarly formed link can be joined thereto by interdigitating the trunnions thereof over the link's shank and then shifting the trunnions to the closed ends of the semi-raceways for articulation of the links in a chain formed thereby.

The above and other objects and features of the invention will be apparent from a reading of the following description of the disclosure found in the accompanying drawing and the novelty thereof pointed out in the appended claims.

In the drawing:
FIG. 1 is a perspective view of one side of a bar type chain conveyor;
FIG. 2 is a perspective view of a chain link embodying the present invention;
FIG. 3 is a side view of this length of chain with portions in section;
FIG. 4 is a plan view with portions in section, of a length of chain formed by links of this invention;
FIGS. 5 and 6 illustrate the manner in which two such chain links are joined.

FIG. 1, in simplified fashion, illustrates a portion of a bar type conveyor in which an endless chain 10 is trained around a pair of double sprockets 12, 14. Bars 16 are connected to the chain 10 and extend to a correspondingly mounted chain (not shown). The upper sprocket 14 is driven, by appropriate means, so that the bars 16 may advance articles along a plate (not shown) beneath the upper run of the conveyor.

FIG. 2 illustrates an individual link 20 employed in forming the chain 10. The link 20 comprises a pair of trunnions 22 projecting from the arms 24 of a clevis 26. The bridge 28 of the clevis is joined to a shank 30. At the other end of the shank 30 and on opposite sides thereof are semi-raceways 32 having their outer ends closed and their inner ends opening toward the clevis bridge 28. A lug 34 projects outwardly from the side of one of the clevis arms 24. A hole 36 enables attachment of a conveying element to the link, as for example one of the bars 16 seen in FIG. 1.

The length of chain seen in FIGS. 2 and 3 is formed by links 20, 20′. The links 20′ are identical with the links 20 with the exception that the lug 34 has been omitted. It will be seen that the outer end of each shank 30 is interdigitated within the clevis 26 of the next adjacent link with each pair of trunnions 22 being respectively received within the semi-raceways 32 to provide controlled articulation between the links.

The described links 20, 20′ when formed into the chain 10, may be employed with a double sprocket 14 as indicated above, and illustrated by the phantom showing in FIGS. 3 and 4. The double sprocket 14 may be of more or less conventional design, comprising two rows of teeth 38 which fit on opposite sides of the shanks 30. The outer end surfaces of the clevis bridge 28 and the clevis arms 24 are convexly curved so as to properly engage the sprocket teeth 38 regardless of the direction the chain is driven.

Joining of the links 20 or 20′ is extremely simple as will be apparent from FIGS. 5 and 6. Several features contribute to this facility. The spacing between trunnions 22 is slightly greater than the width of the shank 30. The rounded ends of the clevis arms 24 and the sloping surfaces 40, FIGS. 2 and 4, at the entrances to the semi-raceways 32 permit the links to approach each other, for interdigitation, at right angles as shown in FIG. 5.

When the trunnions 22 are fully interdigitated with the shank 30, the trunnions 22 are automatically registered respectively, with the open ends of the semi-raceways 32, by engagement of the inner surface of the clevis bridge 28 with the shank 30 (FIG. 5). Assembly is completed by shifting the trunnions 22 to the closed ends of the semi-raceways 32 (FIG. 6) and then articulating the links from their right angular relationship, as to the relative position of FIG. 3. The entire procedure may literally be done with one's eyes closed.

Ease of assembly is contributed to by the fact that the links are symmetrical about both vertical and horizontal, central, lengthwise planes. This minimizes pre-positioning requirements in that there is no "top" surface of a link which must be identified relative to a "bottom" surface of another link. This feature also gives the advantage of being able to join the links with the described approach and interdigitation step being from either the top or bottom as indicated by the link 20′, as shown in phantom in FIGS. 5 and 6.

It will be noted that the inner surface of the clevis bridge 28 is generally concentric of the curved end of shank 30. This not only gives greater strength, but further contributes to preventing inadvertant disassembly of the links after they have been joined. More particularly this curved inner surface prevents shifting of the trunnions to the open ends of the semi-raceways 32 until the links are first articulated to at least about a right angular relationship. In use, this enables a chain to be temporarily "pushed" in making repairs, as well as being "pulled" by a driving sprocket in normal operation. Also, in many cases there will be a considerable sag in the lower run of a chain as indicated in FIG. 1. Often this lower run will bounce up and down in the operation of the conveyor imposing a "push" on adjacent links. With the described connection, it is virtually impossible for the links to fall apart in normal use.

The described link is also inexpensive since either of the links 20 or 20′ may be readily cast by conventional techniques and no machining operations are required.

Variations in the described preferred embodiments of the invention will occur to those skilled in the art within the scope of the present invention and its concepts which are to be derived solely from the following claims.

Having thus described the invention what is claimed as novel and desired to be secured by Letters Patent of the United States is:

1. A unitary link for assmbly with similar links to form a chain, said link comprising:
   a clevis formed by a pair of arms projecting in one direction from a bridge,
   a shank extending from the center of the clevis bridge in the opposite direction,
   a pair of trunnions projecting inwardly from the clevis arms, the ends of said trunnions being spaced apart slightly greater than the width of said shank,
   a pair of semi-raceways formed on opposite sides of said shank, said raceways having open ends facing the clevis bridge and closed outer ends,
   the open ends of the semi-raceways being spaced from the clevis a distance sufficient to permit the trunnions of a similarly formed link to be interdigitated with said shank and then shifted to the closed ends of the semi-raceways for articulation of the links,
   said trunnions being spaced from said clevis bridge a distance less than the distance from the outer end of the shank to the open ends of the semi-raceways whereby the link may be interdigitated with the shank of another link only when at a substantially right angular relationship thereto.

2. A link as in claim 1 wherein, the outer ends of the clevis arms and the outer surface of the clevis bridge are convexly curved to facilitate engagement with the teeth of a double sprocket.

3. A link as in claim 2 in which,
   the outer end of the shank is formed on a radius half its height and,
   the inner surface of the clevis bridge is generally concentric of and closely spaced from the end of the shank of a similarly formed link articulated thereto, thereby further preventing shifting of the trunnions of one link in the semi-raceways of another link until the two links have been articulated to approximately a right angular relationship.

4. A link as in claim 1 wherein,
   the inner surface of the clevis bridge is spaced from the centers of the trunnions a distance approximating one-half the height of the shank,
   whereby the trunnions of one link will automatically be registered with the open ends of the raceways of another link when the two links are interdigitated, and further wherein,
   the trunnions, semi-raceways, shank, clevis bridge and the outer end portions of the clevis arms are symmetrical about vertical and horizontal planes extending lengthwise through the link.

5. A link as in claim 4 wherein the open ends of the semi-raceways are beveled to facilitate interdigitation of two links.

6. A link as in claim 1 wherein a lug projects from the side of one of the clevis arms to provide for attachment of a conveying element thereto.

References Cited

UNITED STATES PATENTS

| | | | |
|---|---|---|---|
| 1,069,536 | 8/1913 | Dodge | 198—175 |
| 1,731,609 | 10/1929 | Brayton | 198—175 |

RICHARD E. AEGERTER, Primary Examiner

U.S. Cl. X.R.

59—84; 74—250